Figure 1:
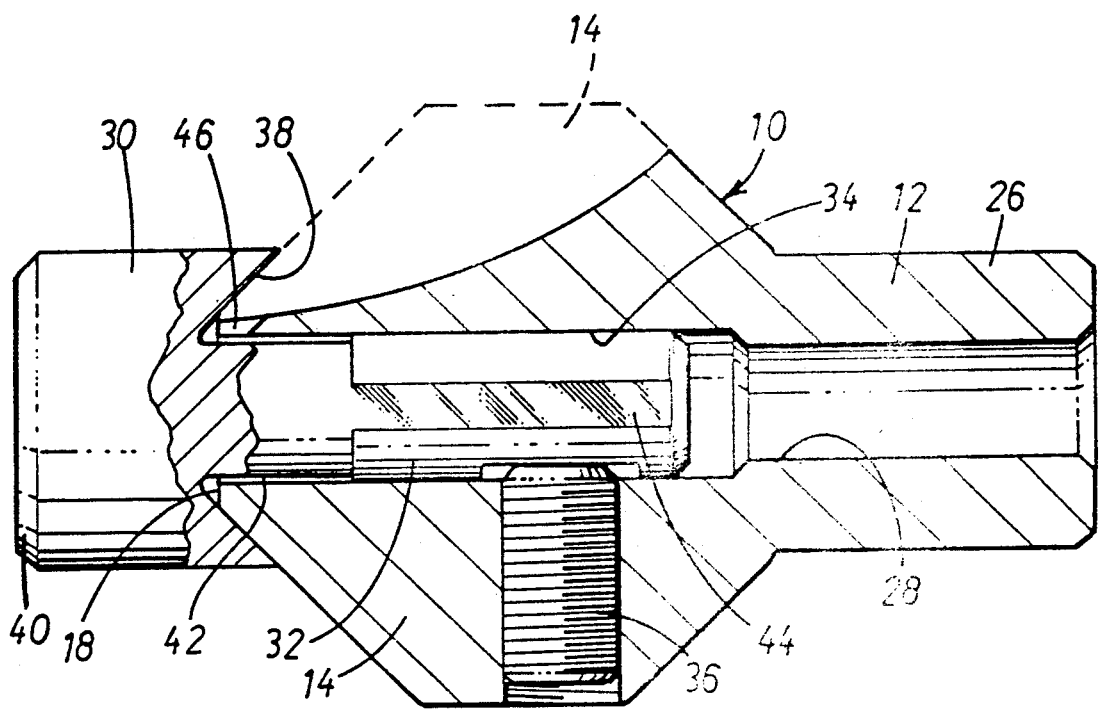

United States Patent [19]

Wood

[11] Patent Number: 5,030,040
[45] Date of Patent: Jul. 9, 1991

[54] ROTARY CUTTER

[75] Inventor: Brian H. Wood, Sheffield, Great Britain

[73] Assignee: Rotabroche Limited, Sheffield, Great Britain

[21] Appl. No.: 546,393

[22] Filed: Jun. 29, 1990

[51] Int. Cl.⁵ .................. B23B 51/06; B23B 51/10
[52] U.S. Cl. ........................... 408/59; 407/11; 407/57; 408/201; 408/225; 408/229; 408/57
[58] Field of Search ............. 408/201, 211, 223–225, 408/227, 229, 57, 59; 407/11, 57

[56] References Cited

U.S. PATENT DOCUMENTS

| 1,016,116 | 1/1912 | Walters | 408/201 |
| 1,464,298 | 8/1923 | Stein | 408/201 |
| 2,865,237 | 12/1958 | Degenhart | 408/201 |
| 3,028,772 | 4/1962 | Mossberg | 408/201 X |
| 4,197,042 | 4/1980 | Krhounek et al. | 408/225 X |

FOREIGN PATENT DOCUMENTS

| 554111 | 6/1943 | United Kingdom. |
| 2018644 | 10/1979 | United Kingdom | 408/201 |

Primary Examiner—Steven C. Bishop
Attorney, Agent, or Firm—Fay, Sharpe, Beall, Fagan, Minnich & McKee

[57] ABSTRACT

The cutting edges (16) of a 3-toothed countersink bit (10) lead slightly in the direction of rotation by an amount (t). The rear face (38) of the head (40) of a detachable pilot (30) is concave so as to fit snugly over the forward end of the bit (10). Lubricant is supplied via a bore (28), flats (44) on the pilot shank (32), a chamber (42) at the mesal end of the shank (32) and notches (46) in the tip of the bit to the spaces between the teeth (14).

7 Claims, 1 Drawing Sheet

ROTARY CUTTER

DESCRIPTION

The present invention relates to rotary cutters and, more particularly, to countersink bits having cutting teeth whose cutting edges lie in an imaginary conical surface corresponding to the cone angle of the desired countersink.

A common problem with known countersink bits is that they tend to chatter especially when attempting to machine at high cutting speeds and/or machining a deep countersink. One attempt to alleviate this problem lies in providing a large number (preferably a prime number) of teeth. However, countersink bits with a large number of teeth are expensive to manufacture and re-sharpen. Another proposed solution has been to provide the countersink bit with a pilot dimensioned to fit closely in the hole to be countersunk. However, such a pilot has not been effective when the countersinking metal plate to a depth approaching the thickness of the plate, since the pilot then emerges completely from the underside of the plate and can no longer centre the bit relative to the hole.

According to one aspect of the present invention, the cutting edges of the teeth lead slightly in the intended direction of rotation. That is to say, an imaginary continuation of each cutting edge does not intersect the longitudinal axis of the bit but is skew relative thereto. It has been found that the adoption of this feature leads to an improved machining performance.

According to another aspect of the invention, a countersink bit is provided with a detachable pilot adapted to the shape of the bit so as to define a cylindrical guide surface substantially right up to the cutting edges. By adopting this measure, the pilot can centre the bit with reference to the hole being countersunk, even when the countersink almost breaks through to the rear face of the workpiece being machined.

By adopting either, but preferably both of the features above, a countersink bit having as few as three teeth can be used satisfactorily without chatter which would lead to uneveness of the countersink.

According to a further aspect of the invention a countersink bit has a longitudinal through bore and is provided with a detachable pilot which has an anchoring spigot receivable in the forward end of the bore, the spigot being shaped to provide fluid communication between the bore and a space at the mesal end of the spigot and the bit being shaped at its tip to provide fluid communication between the said space and the cutting teeth, whereby to enable cutting fluid (lubricant and/or coolant) to be fed to the cutting edges from a drill spindle to which the countersink bit is attached. This measure provides for the effective supply of cutting fluid to the cutting edges.

Figure 2:
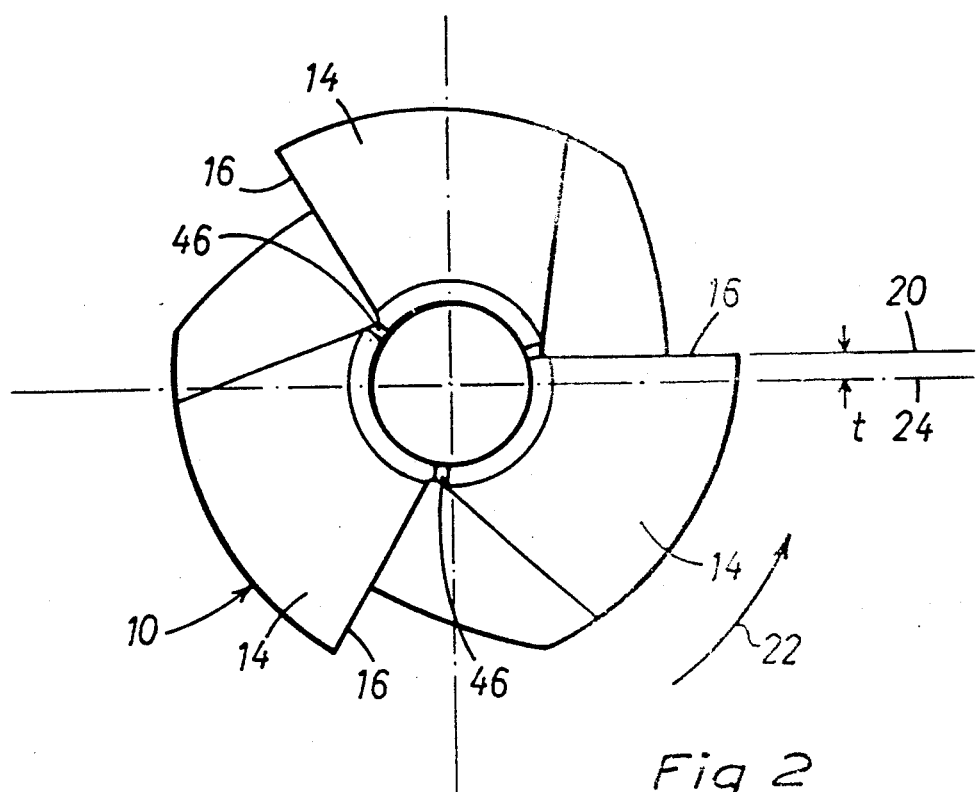

The invention is further described, by way of example, with reference to the accompanying drawings, in which FIG. 1 is a longitudinal sectional view of a countersink bit provided with a detachable pilot in accordance with a preferred embodiment of the invention, and FIG. 2 is an end view of the bit with the pilot removed.

Referring to the drawings, a countersink bit 10 comprises a unitary body 12 provided with three equi-angularly spaced, identical teeth 14. Each tooth has a straight cutting edge 16, which extends rearwardly from the tip 18 of the bit body 12, whereby the cutting edges define a conical surface of revolution corresponding to the desired countersink.

As can be seen from FIG. 2, each cutting edge 18 lies in a longitudinal plane 20 parallel to the axis of the bit. However, each cutting edge 18 is slightly skew and leads in the direction 22 of rotation of the bit 10 relative to the workpiece (not shown). Thus each longitudinal plane 20 is spaced by a small amount t from the axial plane 24 parallel to the longitudinal plane 20.

By way of example, the illustrated bit 10 (which is not drawn to any particular scale) is designed for countersinking holes of any diameter lying in a range of 14 to 22 mm and has a lead dimension t of 1.5 mm.

The bit body 12 has a cylindrical shank 26 by which the bit 10 can be attached to a drill spindle or arbor (not shown) by means of an adaptor, if necessary. The bit 10 has an axial through bore 28. The rear end of the bore 28 communicates with a feed bore in the drill spindle and/or with a feed chamber in the adaptor (if provided), whereby cutting fluid can be fed continuously to the bore 28.

A pilot 30 has a shank 32 which is received in a slightly enlarged forward end portion 34 of the through bore 28. A grub screw 36 in the bit body 14 engages the pilot shank 32 to hold the pilot 30 in place, as shown in FIG. 1.

The rear face 38 of the cylindrical head 40 of the pilot 30 is concave frusto-conically shaped so as to match the surface of revolution defined by the cutting edges 16. The pilot 30 thereby fits snugly over the forward end of the bit 10.

At its root or mesal end, the pilot shank 32 has a shallow undercut to define an annular chamber 42. The shank 32 has at least one longitudinal flat 44 which places the chamber 42 in communication with the rear end of the bore 28. Three notches 46 are formed in the tip face 18 of the bit 10 and place the gaps between the teeth 14 in communication with the chamber 42, whereby cutting fluid supplied to the rear end of the bore 18 is fed to the cutting edges 16.

In use, the bit 10 is fitted with a pilot 30 whose head diameter corresponding to the diameter of the bore in the workpiece to be countersunk. The bit 10 is attached to the arbor or drill spindle, via an adapter if necessary. The arrangement is such that cutting fluid can be supplied continuously to the bit bore 28 during machining, either via the adaptor, if provided, or via a through bore in the drill spindle. Cutting fluid, such as a lubricant and/or coolant is thereby fed to the cutting edges much more reliably than by spraying fluid onto the bit.

Because the pilot is adapted to the shape of the countersink bit, the latter is reliably guided by the pilot virtually up to the point at which the bit 10 itself is about to break through the workpiece.

The leading arrangement of the cutting edges 14 enables faster cutting speeds to be achieved and the pilot 30 substantially avoids chatter, even though there are only three cutting edges. The flow of cutting fluid keeps the bit cool, acts as a cutting lubricant and flushes away the chips.

The leading arrangement of the cutting edges by the distance t does means that the countersink is not truely conical, but the amount of out-of-line is normally negligible. If thought necessary, this error could be eliminated by curving the cutting edges ever so slightly.

I claim:

1. In combination: a countersink bit and a pilot, said bit having an intended direction of rotation and having at a forward end thereof a plurality of circumferentially spaced teeth each provided with a cutting edge, said cutting edges defining a substantially conical surface of revolution, said cutting edges being effective to cut a countersink in accordance with said conical surface of revolution upon rotation of said bit in said intended direction of rotation, said cutting edges leading in said intended direction of rotation, said bit having a longitudinal bore extending longitudinally centrally from said forward end of said bit, said pilot having an anchoring spigot detachably received in said longitudinal bore at said forward end of said bit and a head which defines a cylindrical guide surface coaxial with said bit, said head having a frusto-conically shaped concave rear surface, said rear surface being shaped to exactly match said conical surface of revolution, whereby said cylindrical guide surface extends rearwardly up to said cutting edges.

2. A bit according to claim 1, in which said plurality of teeth comprise three teeth in number.

3. A bit according to claim 1, which further comprises means at a mesal end of said spigot to define a fluid-receiving space, said spigot defining passage means for conducting cutting fluid from said longitudinal bore to said fluid-receiving space and said bit having at its forward end notch means to place said fluid-receiving space in communication with gaps defined between said teeth.

4. The combination of claim 3, wherein said bit has a rearward shank adapted to be attached to a machine spindle having a lubricant supply passage and said longitudinal bore is a through bore, whereby said through bore is connected at its rearward end to said lubricant supply passage when said bit is attached to said spindle.

5. A rotary countersinking tool comprising:
   a countersink bit having an intended direction of rotation and having at a forward end thereof a plurality of circumferentially spaced teeth, separated by gaps, each of said teeth being provided with a cutting edge, said cutting edges defining a substantially conical surface of revolution and being effective to cut a countersink in accordance with said conical surface of revolution upon rotation of said bit in said intended direction of rotation; and,
   a pilot including a head and an anchoring spigot secured at one end to said head, said spigot being detachably received in a longitudinal bore at a forward end of said bit, said spigot comprising at least one fluid passage for conducting a cutting fluid from said countersink bit bore to a fluid holding space defined between a root end of said spigot and said head, and wherein said countersink bit further comprises at its forward end a notch employed to place said spigot fluid receiving space in communication with at least one of said gaps between said spaced teeth.

6. The tool of claim 5 wherein said head defines a cylindrical guide surface with said bit, said head having a frusto-conical shaped concave rear surface, said rear surface being shaped to match said conical surface of revolution so that said cylindrical guide surface extends rearwardly up to said cutting edges.

7. The tool of claim 5 wherein said teeth are of one piece with said countersink bit.

* * * * *

UNITED STATES PATENT AND TRADEMARK OFFICE
CERTIFICATE OF CORRECTION

PATENT NO. : 5,030,040
DATED : July 9, 1991
INVENTOR(S) : Brian H. Wood

It is certified that error appears in the above—identified patent and that said Letters Patent is hereby corrected as shown below:

On the cover page, at line (73), please correct the spelling of "Rotabroche" to ---Rotabroach---.

Signed and Sealed this

Tenth Day of November, 1992

Attest:

DOUGLAS B. COMER

Attesting Officer

Acting Commissioner of Patents and Trademarks